United States Patent
Carolan et al.

[11] Patent Number: 5,817,597
[45] Date of Patent: Oct. 6, 1998

[54] COMPOSITIONS CAPABLE OF OPERATING UNDER HIGH OXYGEN PARTIAL PRESSURES FOR USE IN SOLID-STATE OXYGEN PRODUCING DEVICES

[75] Inventors: Michael Francis Carolan; Paul Nigel Dyer, both of Allentown; Stephen Andrew Motika, Kutztown, all of Pa.

[73] Assignee: Air Products and Chemicals, Inc., Allentown, Pa.

[21] Appl. No.: 600,667

[22] Filed: Feb. 29, 1996

Related U.S. Application Data

[63] Continuation-in-part of Ser. No. 402,689, Mar. 13, 1995.
[51] Int. Cl.$^6$ .............................. B01J 23/32; B01J 20/00; B01D 52/02; B01D 53/22
[52] U.S. Cl. ......................... 502/400; 502/400; 502/324; 95/54; 96/4
[58] Field of Search ................................. 502/324, 400; 95/54; 96/4

[56] References Cited

U.S. PATENT DOCUMENTS

| | | | |
|---|---|---|---|
| 5,240,480 | 8/1993 | Thorogood et al. | 96/4 |
| 5,356,728 | 10/1994 | Balachandran et al. | 429/8 |
| 5,534,471 | 7/1996 | Carolan et al. | 502/4 |
| 5,569,633 | 10/1996 | Carolan et al. | 502/4 |

FOREIGN PATENT DOCUMENTS 0705 790 A1  4/1996  European Pat. Off. .
WO 94/24065  10/1994  WIPO .

OTHER PUBLICATIONS

Yamazoe and coworkers (Mat. Res. Bull., vol. 23, pp. 51–58, 1988).
Teraoka and coworkers (Chem. lett. pp. 503–506 1988).
Kharton and coworkers (Inorganic Materials, vol. 30, No. 4, 1994, pp. 492–495).

*Primary Examiner*—Glenn Caldarola
*Assistant Examiner*—Tanaga A. Boozer
*Attorney, Agent, or Firm*—Keith D. Gourley

[57] ABSTRACT

The present invention presents a new class of multicomponent metallic oxides which are particularly suited toward use in fabricating component used in solid-state oxygen separation devices. The compositions of the present invention are represented by the formula $Ln_x A'_{x'} Co_y Fe_{y'} Cu_{y''} O_{3-z}$ wherein Ln is an element selected from the f block lanthanides as represented by the IUPAC periodic table of the elements, A' is selected from strontium or calcium, $x>0$, $y>0$, $y'>0$, $x+x'=1$, $y+y'+y''=1$, $0 \leq y'' < 0.4$ and z is a number which renders the composition of matter charge neutral. These compositions provide a favorable balance of oxygen permeance, resistance of degradation when employed in such devices under high oxygen partial pressures and possess coefficients of thermal expansion which are compatible with other materials used to fabricate such devices.

7 Claims, 11 Drawing Sheets

COMPOSITIONS CAPABLE OF OPERATING UNDER HIGH OXYGEN PARTIAL PRESSURES FOR USE IN SOLID-STATE OXYGEN PRODUCING DEVICES

RELATED U.S. APPLICATION DATA

This application is a continuation-in-part of copending U.S. Patent application Ser. No. 08/402,689, filed on Mar. 13, 1995, the Specification which is incorporated by reference and made a part of this Application.

This invention relates to novel multicomponent metallic oxides which are particularly suited toward use in fabricating solid-state oxygen producing devices. The compositions comprise barium-free multicomponent metallic oxides containing copper, iron and cobalt which provide favorable sintering and thermal expansion properties and enable such oxygen producing devices to be operated under elevated oxygen partial pressures.

STATEMENT REGARDING FEDERALLY SPONSORED RESEARCH OR DEVELOPMENT

This invention was made with United States government support under NIST ATP Award 70NANB4H1503, awarded by the National Institute of Standards and Technology.

BACKGROUND OF THE INVENTION

Solid state membranes formed from oxygen ion-conducting materials continue to show promise for use in commercial processes for separating and recovering oxygen from oxygen-containing gaseous mixtures as well as for reacting oxygen formed therefrom with a feedstock comprising light hydrocarbons such as methane, natural gas, ethane or any available light hydrocarbon mixture. Representative membranes are those formed from multicomponent metallic oxides which are typically operated at high temperatures (e.g. 600° C. or more) wherein the membranes conduct both oxygen ions and electrons. When a difference in oxygen partial pressure exists on opposite sides of the multicomponent metallic oxide membrane and operating conditions are properly controlled, oxygen is transported in the form of oxygen ions from the high oxygen partial pressure side to the low oxygen partial pressure side of the membrane while an electron flux occurs in the opposite direction of oxygen ion migration in order to conserve charge, producing pure oxygen on the permeate side of the membrane.

Multicomponent metallic oxides to be employed in devices for producing oxygen must exhibit a variety of mechanical and physical properties in order to provide sufficient operating life and to perform according to desired operating specifications. Preferred materials should possess high thermal stability, a suitable coefficient of thermal expansion between ambient and device operating temperatures and a sufficiently high sintering temperature. Moreover, devices incorporating such materials should be capable of being subjected to elevated oxygen partial pressures without observing any appreciable loss in oxygen transport properties. Unfortunately, typical multicomponent metallic oxides known in the art provide varying degrees of these essential attributes. Therefore, the ceramist must endeavor to optimize the composition of such materials to achieve acceptable levels of each of the identified mechanical and physical properties.

Yamazoe and coworkers (Mat. Res. Bull., Vol. 23, pp. 51–58, 1988) disclose perovskite-type oxides represented by the formula $La_{1-x}Sr_xCo_{1-y}Fe_yO_{3-\delta}$ which demonstrate electronic conductivity and oxygen-ionic conductivity (mixed conductivity) at elevated temperatures. The paper evaluates the mixed conductivities of representative materials as a function of temperature.

Teraoka and coworkers (Chem. Lett. pp. 503–506 1988) disclose the effect of cation substitution on the oxygen semipermeability of perovskite-type oxides represented by the form $La_{0.6}Sr_{0.4}Co_{0.8}B'_{0.2}O_{3-\delta}$ wherein B' is individually selected from Co, Mn, Fe, Ni, Cu or Cr. The paper also presents compositions represented by the formula $La_{0.6}A'_{0.4}Co_{0.8}Fe_{0.2}O_{3-\delta}$ wherein A' is individually selected from Na, Ba, La, Sr or Ca. The paper concludes that materials demonstrating improved oxygen permeability can be prepared by partially substituting cobalt in the perovskite with copper or nickel.

U.S. Pat. No. 5,240,480 discloses representative solid-state membranes for separating oxygen from oxygen-containing gaseous mixtures. These membranes comprise a multicomponent metallic oxide porous layer and a multicomponent metallic oxide dense layer having no connected through porosity wherein the porous and dense layers are contiguous and such layers conduct electrons and oxygen ions at operating temperatures. Suitable multicomponent metallic oxides are represented by the structure $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $0\leq y''\leq1$, $x+x'+x''=1$, $y+y'+y''=1$ and z is a number which renders the compound charge neutral. Preferably, A, A' or A" of the enumerated structure is a Group 2 metal selected from the group consisting of calcium, strontium, barium and magnesium. Preferred mixed conducting oxides which can be deposited are represented by the formula $La_xA_{1-x}Co_yFe_{1-y}O_{3-z}$ wherein x is between 0 and 1, y is between 0 and 1 and A is selected from barium, strontium or calcium.

U.S. Pat. No. 5,356,728 and European Patent Application WO 94/24,065 disclose cross-flow electrochemical reactor cells formed from multicomponent metallic oxides of the perovskite structure which demonstrate both electron conductivity and oxygen ion conductivity at elevated temperatures. Such cells are useful in carrying out partial oxidation reactions of organic compounds to form added-value products and separating oxygen from oxygen-containing gaseous mixtures.

Kharton and coworkers (Inorganic Materials, Vol. 30, No. 4, 1994 pp. 492–495) disclose perovskite-type multicomponent metallic oxides presented by the formula $SrCo_{1-x-y}Fe_xCu_yO3_{-\delta}$ wherein $0\leq x\leq0.40 \leq y\leq0.4$. The investigators state that practical applications of such Fe-substituted strontium cobaltates are limited due to difficulties associated with structural failure of the ceramics during thermal cycling. The sintering properties of such materials were notably improved which copper was incorporated in the crystal lattice. The physicochemical properties of $SrCo(Fe,Cu)O_{3-\delta}$ solid solutions were studied as a function of substituting cobalt with iron and copper.

Those skilled in the art are searching for multicomponent metallic oxides of the perovskite-type for use in solid-state oxygen-producing devices which overcome problems associated with incompatible physical and mechanical properties. Such materials would tolerate being subjected to elevated oxygen partial pressures during operation while also possessing high oxygen flux, a coefficient of thermal expansion which is compatible with other materials used in constructing oxygen separation devices, suitable sintering properties and stability under process operating conditions.

BRIEF SUMMARY OF THE INVENTION

Applicants have discovered a new class of multicomponent metallic oxides which are particularly suited toward use in fabricating components used in solid-state oxygen separation devices. These materials overcome problems associated with prior art materials by providing a favorable balance of oxygen permeance, resistance to degradation when employed in such devices under elevated oxygen partial pressures, favorable sintering properties, and possess coefficients of thermal expansion which are compatible with other materials used to fabricate such devices.

The compositions of the present invention are represented by the formula $Ln_xA'_{x'}Co_yFe_{y'}Cu_{y''}O_{3-z}$ wherein Ln is an element selected from the f block lanthanides as represented by the IUPAC periodic table of the elements, A' is selected from strontium or calcium, x>0, y>0, y'>0, x+x'=1, y+y'+y''=1, 0<y''≦0.4 and z is a number which renders the composition of matter charge neutral.

Applicants have further discovered that significant cost savings can be enjoyed by utilizing a mixture of lanthanides for Ln as represented by the above-mentioned formula instead of individual, highly pure lanthanides of the f block of the IUPAC periodic table of the elements. For example, highly pure lanthanum oxide is substantially more expensive than a mixture of lanthanum oxide, cerium oxide, praseodymium oxide and neodymium oxide which is commercially available from Molycorp, a division of Unical Corporation, Los Angeles, Calif. Thus, such compositions are represented by the generic formula $Z_xA'_{x'}Co_yFe_{y'}Cu_{y''}O_{3-z}$ wherein Z is a mixture of lanthanum and at least one element other than lanthanum which is selected from the f block lanthanides as represented by the IUPAC periodic table of the elements, A' is selected from strontium or calcium, x>0, y>0, x +x'=1, y'>0, 0<y''≦0.4, y +y'+y''=1,and z is a number which renders the composition of matter charge neutral.

Particularly suitable materials according to the present invention are represented by the formula $La_xA'_{x'}Co_yFe_{y'}Cu_{y''}O_{3-z}$ wherein A' is selected from strontium or calcium, x>0, y>0, x +x'=1, y'>0, 0<y''≦0.4, y +y' +y''=1,and z is a number which renders the composition of matter charge neutral. Representative compositions include $La_{0.2}Sr_{0.8}Co_{0.4}Fe_{0.4}Cu_{0.2}O_{3-z}$ wherein A' is strontium, x is 0.2, x' is 0.8 and y is 0.4, y' is 0.4 and y'' is 0.2; $La_{0.4}Sr_{0.6}Co_{0.4}Fe_{0.4}Cu_{0.2}O_{3-z}$ wherein A' is strontium, x is 0.4, x' is 0.6 and y is 0.4, y' is 0.4 and y'' is 0.2; $La_{0.3}Sr_{0.7}Co_{0.8}Fe_{0.1}Cu_{0.1}O_{3-z}$ wherein A' is strontium, x is 0.3, x' is 0.7 and y is 0.8, y' is 0.1 and y'' is 0.1; $La_{0.6}Ca_{0.4}Co_{0.2}Fe_{0.6}Cu_{0.2}O_{3-z}$ wherein A' is calcium, x is 0.6, x' is 0.4 and y is 0.2, y' is 0.6 and y'' is 0.2.

Applicants' invention can be more readily understood by referring to the Detailed Description of the Invention and the figures which are attached hereto.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
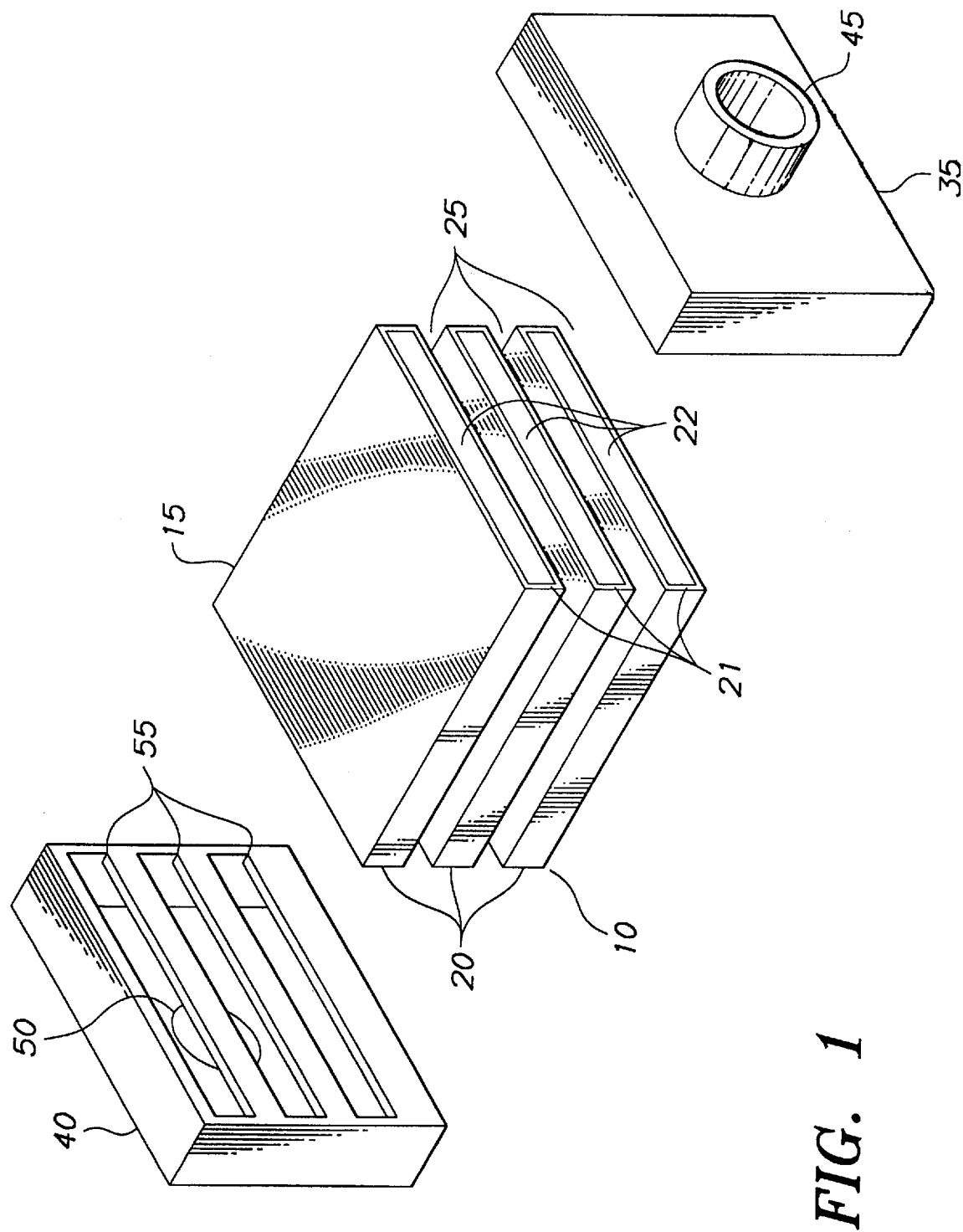
FIG. 1 is an exploded perspective view of one embodiment of a planar solid-state electrochemical module comprising a plurality of planar membrane units formed from a dense mixed conducting oxide layer which is supported by and contiguous with a channel-free porous support having connected through porosity. The removal means for discharging oxygen from each planar membrane unit comprises at least one conventional manifold.

Applicants have discovered a new class of multicomponent metallic oxides which are particularly suited toward use in fabricating components used in solid-state oxygen separation devices. These materials overcome problems associated with prior art materials by providing a favorable balance of oxygen permeance, resistance to degradation when employed in such devices under high oxygen partial pressures, favorable sintering properties, and possess coefficients of thermal expansion which are compatible with other materials used to fabricate such devices.

The compositions of the present invention are represented by the formula $Ln_xA'_{x'}Co_yFe_{y'}Cu_{y''}O_{3-z}$ wherein Ln is an element selected from the f block lanthanides as represented by the IUPAC periodic table of the elements, A' is selected from strontium or calcium, x>0, y>0, y'>0x+x'=1, y+y'+y''=1, 0<y''≦0.4 and z is a number which renders the composition of matter charge neutral.

Applicants have further discovered that significant cost savings can be enjoyed by utilizing a mixture of lanthanides for Ln as represented by the above mentioned formula instead of individual, highly pure lanthanides of the f block of the IUPAC periodic table of the elements. For example, highly pure lanthanum oxide is substantially more expensive than a mixture of lanthanum oxide, cerium oxide, praseodymium oxide and neodymium oxide which is commercially available from Molycorp, a division of Unical Corporation, Los Angeles, Calif. Thus, such compositions are represented by the generic formula $Z_xA'_{x'}Co_yFe_{y'}Cu_{y''}O_{3-z}$, wherein Z is a mixture of lanthanum and at least one element other than lanthanum which is selected from the f block lanthanides as represented by the IUPAC periodic table of the elements, A' is selected from strontium or calcium, x>0, y>0, x+x'=1, y'>0, 0<y''≦0.4, y+y'+y''=1,and z is a number which renders the composition of matter charge neutral.

Particularly suitable materials according to the present invention are represented by the formula $La_xA'_{x'}Co_yFe_{y'}Cu_{y''}O_{3-z}$ wherein A' is selected from strontium or calcium, x>0, y>0, x+x'=1, y'>0, 0<y''≦0.4, y+y'+y''=1,and z is a number which renders the composition of matter charge neutral. Representative compositions include $La_{0.4}Sr_{0.6}Co_{0.4}Fe_{0.4}Cu_{0.2}O_{3-z}$ wherein A' is strontium, x is 0.4, x' is 0.6 and y is 0.4, y' is 0.4 and y'' is 0.2; $La_{0.3}Sr_{0.7}Co_{0.8}Fe_{0.1}Cu_{0.1}O_{3-z}$ wherein A' is strontium, x is 0.3, x' is 0.7 and y is 0.8, y' is 0.1 and y'' is 0.1; $La_{0.6}Ca_{0.4}Co_{0.2}Fe_{0.6}Cu_{0.2}O_{3-z}$ wherein A' is calcium, x is 0.6, x' is 0.4 and y is 0.2, y' is 0.6 and y'' is 0.2.

The improvements afforded by the novel multicomponent metallic oxides of the present invention shall be best appreciated following a description of the oxygen separation devices which utilize such materials and a presentation of the data which compares the properties of the claimed compositions to the properties afforded by prior art compositions for the subject process applications.

FIG. 1 is an exploded perspective view of an embodiment of a planar module comprising a plurality of air separation membrane units. Planar module 10 possesses an array 15 of gas separation membrane units 20 which are separated by passageways 25. Each membrane unit 20 comprises a porous support 22 and dense mixed conducting oxide layer 21. Structures 35 and 40 adjacent opposite entrance and exit surfaces of the membrane array of modules 15 defines spaced entrance and exit manifolds having receiving structures 55 into which membrane units 20 are received. Thus, manifolds 35 and 40 are in flow communication with the porous layers 22 of each membrane 20 within the array of membranes 15. Inlet lines 45 and 50 are situated in manifolds 35 and 40 and are adapted to carry oxygen product from the module 10.

The embodiment according to FIG. 1 can be conveniently utilized to separate oxygen from an oxygen-containing gaseous mixture by introducing the oxygen-containing gaseous mixture through passageways 25 and into contact with the dense mixed conducting layers 21 of each of the membrane units 20.

The driving force for separating oxygen from an oxygen-containing gaseous mixture is provided by creating a difference in oxygen partial pressure on opposite sides of the dense mixed conducting oxide layer of each membrane unit. An oxygen partial pressure difference on opposite sides of dense mixed conducting oxide layer 21 can be created by compressing the oxygen-containing gaseous mixture within passageways 25 to a pressure sufficient to recover the oxygen permeate stream at a pressure of greater than or equal to about one atmosphere. Typical pressures range from about 15 psia to about 250 psia and the optimum pressure will vary depending upon the amount of oxygen in the oxygen-containing gaseous mixture. Conventional compressors are capable of achieving the required compression. Alternately, a positive oxygen partial pressure on opposite sides of dense mixed conducting oxide layer 21 can be achieved by partially evacuating the porous support to a pressure sufficient to recover the oxygen permeate.

The oxygen which has been separated from the oxygen-containing gaseous mixture can be stored in a suitable container or utilized in another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

The planar membrane modules of the present invention can be used for a variety of processes including the separating of any ionizable component from a feedstream wherein such ionizable component is capable of being transported through the ionic conducting electrolyte layer. For example, the ionizable component may be oxygen present in air wherein oxygen ions are passed through the ionic conducting separation components comprising the electrochemical device. Hydrogen can also be separated from a feed stream by fabricating the ionic conducting electrolyte layer from a ceramic which is capable of transporting the ionized hydrogen species. These devices can also be readily adapted to function as partial oxidation devices.

When the membrane unit is to be utilized for producing synthesis gas, the membrane module is heated to a temperature ranging from 700° to 1200° C., preferably from 800° to 1000° C. A feedstock comprising light hydrocarbons such as methane, natural gas, ethane or any available light hydrocarbon mixture is introduced into passageways 25 and an oxygen-containing gaseous mixture is introduced into the porous supports 22 of each membrane unit 20 by passage into manifold 35 via manifold inlet 45. The oxygen-containing gaseous mixtures flows into porous supports 22 of each membrane unit 20 wherein oxygen is ionized and passed across the dense mixed conducting oxide layer 21. The feedstock contacts oxygen ions which are formed at the surface of dense layers 21 resulting in the formation of synthesis gas.

The feedstock to be utilized in carrying out the synthesis gas reaction is preferably natural gas which may be utilized straight from the wellhead or produced industrially by making a composition having about 70 percent by weight of methane, about 10 percent by weight of ethane, 10 percent to 15 percent by weight of carbon dioxide with the balance comprising smaller amounts of propane, butane and nitrogen. The feedstock may optionally be diluted with any inert diluent such as nitrogen, helium and the like. Suitable catalysts include conventional catalysts for producing synthesis gas as are well known in the art.

The membrane module according to FIG. 1 may also be utilized to produce unsaturated hydrocarbons. The process is conducted in a manner analogous to the preparation of synthesis gas wherein the membrane module is heated to a temperature in excess of 500°, preferably from 800° to 1100° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts include Shell 105 catalyst which comprises about 90% iron oxide, 4% chromium oxide and 6% potassium carbonate.

Figure 2:
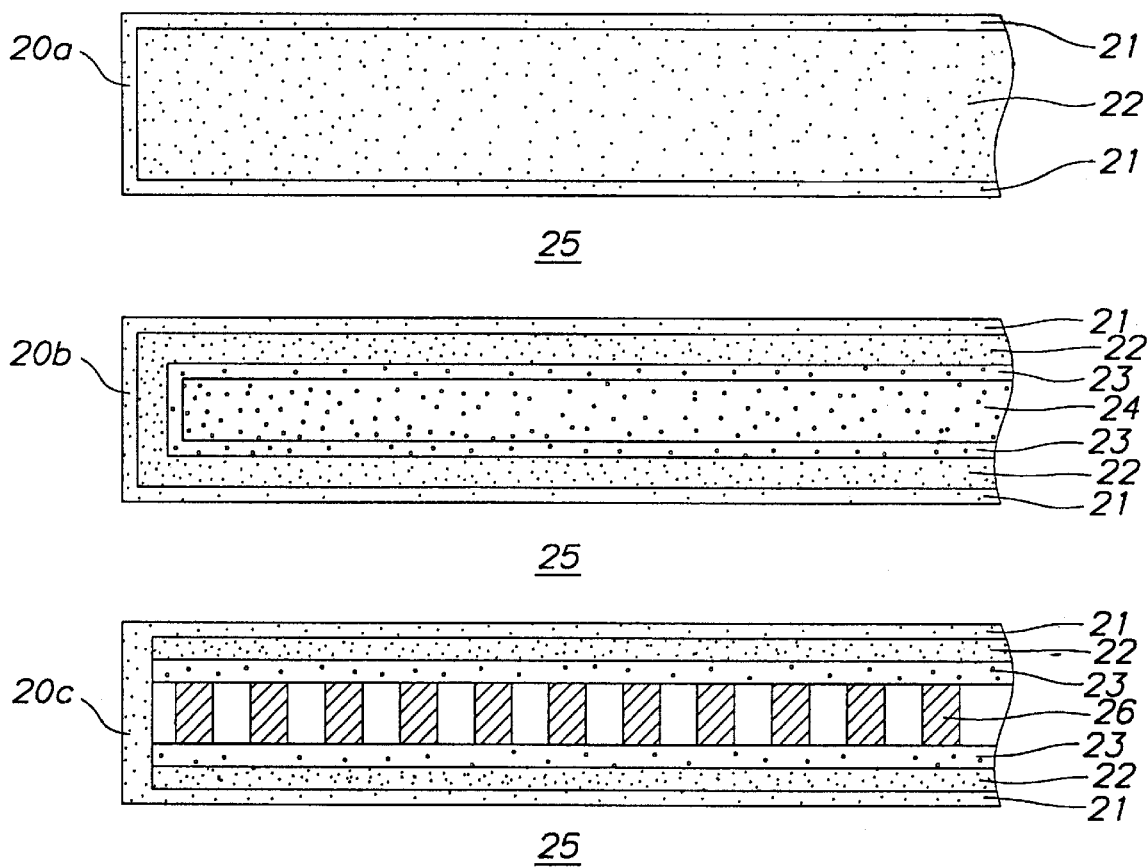
FIG. 2 is a sectional view of the planar solid-state electrochemical module of FIG. 1 which illustrates three membrane unit embodiments, each embodiment which presents a dense mixed conducting oxide layer which is supported by a channel-free porous support have connected through porosity.

FIG. 2 presents a sectional view of the planar solid-state module of FIG. 1. FIG. 2 presents three general embodiments of membrane units which are suitable for practicing the present invention. Referring to FIG. 2, membrane units 20a, 20b, and 20c each possess a dense mixed conducting oxide layer 21 which is situated contiguous to porous support 22. Thus, membrane unit 20a represents the most general membrane unit of the planar modules of the present invention.

Membrane unit 20b of FIG. 2 presents an alternate embodiment which comprises a symmetrical arrangement of layers bounded by dense layer 21. Dense layer 21 is contiguous to support layer 22. Situated adjacent to and contiguous with the support layer 22 are a first porous layer 23 and a second porous layer 24. As noted in the cross-section of membrane unit 20b, the membrane unit possesses symmetry wherein the second porous layer 24 forms the interior portion of the membrane unit onto which a first porous layer 23 is deposited on both sides of the second porous layer 24. Thus, porous support 22 and first and second porous layers 23 and 24, respectively, provide an integral support for the dense separating layer which can withstand the pressure differential exerted on opposite sides of the dense mixed conducting layer of the membrane unit during operating conditions.

The first and second porous layers of membrane unit 20b can be individually deposited such that the second porous layer has a larger average pore radii than the first porous layer 21. Any number of porous layers can be used such that the respective porous layers form a gradient having an average pore radius increasing from 0.5 to about 10 micrometers or more moving away from the interface with the porous support.

These porous layers can be fabricated by starting with a green state formed of a plurality of layers wherein each respective layer comprises successively larger particles. A preferred technique for manufacturing ultrathin solid state membranes is presented in U.S. patent Ser. No. 5,160,618 issued Nov. 3, 1992 which is assigned to Air Products and Chemicals, Inc., Allentown, Pa. Alternately, the membrane unit 20b can be fabricated such that each respective porous layer has an average pore radius which progressively increases as a function of distance from the porous support.

Membrane unit 20c represents an adaptation of membrane unit 20b wherein the second porous layer 24 of membrane unit 20b is replaced by a channeled layer 26. Channeled layer 26 provides channels for receiving oxygen which has permeated dense separating layer 21, passed through porous support 22 and porous layer 23 into the channels of channeled layer 26 for collection as described in this Specification.

Figure 3:
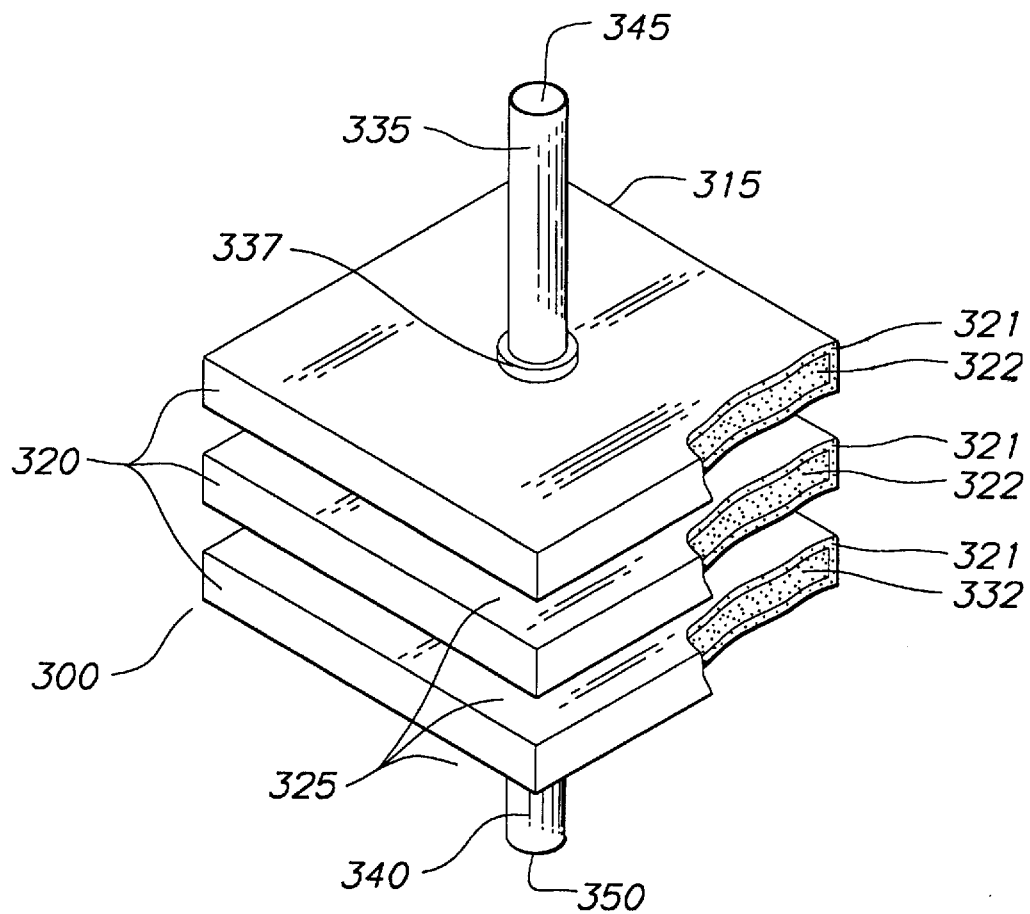
FIG. 3 is an exploded perspective view of another embodiment of a planar solid-state electrochemical module comprising a plurality of planar membrane units formed from a dense mixed conducting oxide layer which is supported by and contiguous with a channel-free porous support having connected through porosity. The removal means for discharging oxygen from each planar membrane unit comprises a conduit which traverses each planar membrane unit and is in flow communication with the porous support of each membrane unit of the module.

FIG. 3 presents an exploded perspective view of another embodiment of the present invention. Planar solid-state electrochemical module 300 comprises an array 315 of membrane units 320 wherein each membrane unit comprises a dense mixed conducting oxide layer 321 which is supported by and contiguous with a channel-free porous support 322 having connected through porosity. The plurality of membrane units 320 are separated by passageways 325 for contacting the oxygen-containing gaseous mixture with the dense layers 321 of membrane units 320.

The array of membranes 315 are traversed by conduit 335 having opening 345 and conduit 345 having opening 350. Conduits 335 and 345 are placed in flow communication with porous supports 322 of each membrane unit 320 and are secured to the membrane array by conduit collar 337 and a conduit collar (not shown) associated with conduit 345.

Conduit collar 337 provides a gas-tight seal between conduit 335 and the array 315 of the membrane units thereby preventing leakage. The collar 337 can be chosen from a wide variety of materials such as oxidation-resistant ceramics, such as ceria or calcia doped ceria, which have a thermal expansion coefficient which is compatible with that of the multicomponent metallic oxide with which the collars are associated. The material used for the collars may also be ion-conducting. Other suitable materials include any inert material which has a thermal expansion coefficient comparable to that of the multicomponent metallic oxide, such as stainless steel or forsterite (a composite magnesium silicate oxide). The collars may be secured to the conduit 335 and the array 315 of membrane unit by co-sintering or by applying a high temperature material such as aluminosilicate glass.

When the membrane module of FIG. 3 is to be utilized for producing synthesis gas, the membrane module is heated to a temperature ranging from 700° to 1200° C., preferably from 800° to 1000° C. A feedstock comprising light hydrocarbons such as methane, natural gas, ethane or any available light hydrocarbon mixture is introduced into passageways 325 and an oxygen-containing gaseous mixture is introduced into the porous supports 322 of each membrane unit 320 by passage into conduit 335 via conduit inlet 345. The oxygen-containing gaseous mixtures flows into porous supports 322 of each membrane unit 320 wherein oxygen is ionized and passed across the dense mixed conducting oxide layer 321. The feedstock contacts oxygen ions which are formed at the surface of dense layers 321 resulting formation of synthesis gas.

The feedstock to be utilized in carrying out the synthesis gas reaction is preferably natural gas which may be utilized straight from the wellhead or produced industrially by making a composition having about 70 percent by weight of methane, about 10 percent by weight of ethane, 10 percent to 15 percent by weight of carbon dioxide with the balance comprising smaller amounts of propane, butane and nitrogen. The feedstock may optionally be diluted with any inert diluent such as nitrogen, helium and the like. Suitable catalysts include conventional catalysts for producing synthesis gas as are well known in the art.

The membrane module according to FIG. 3 may also be utilized to produce unsaturated hydrocarbons. The process is conducted in a manner analogous to the preparation of synthesis gas wherein the membrane module is heated to a temperature in excess of 500°, preferably from 800° to 1100° C. Thus, the feedstock and oxygen-containing gaseous mixture are passed through the membrane module in the same path as the feedstock and oxygen-containing gaseous mixture discussed in the synthesis gas reaction description.

The feedstock may comprise any fully or partially saturated hydrocarbon which is susceptible to dehydrogenation and which is stable at operating temperatures in either its saturated or unsaturated form. Representative feedstocks include aliphatic hydrocarbons containing 1 to 6 carbon atoms, cycloaliphatic hydrocarbons containing 5 or 6 carbon atoms, aromatic compounds having an aliphatic moiety of 2 to 6 carbon atoms. Preferred feedstocks include ethane, propane, ethylbenzene and mixtures containing the same. The feedstock may optionally be diluted with any inert diluent such as nitrogen, helium and the like. Suitable catalysts include Shell 105 catalyst which comprises about 90% iron oxide, 4% chromium oxide and 6% potassium carbonate.

Figure 4:
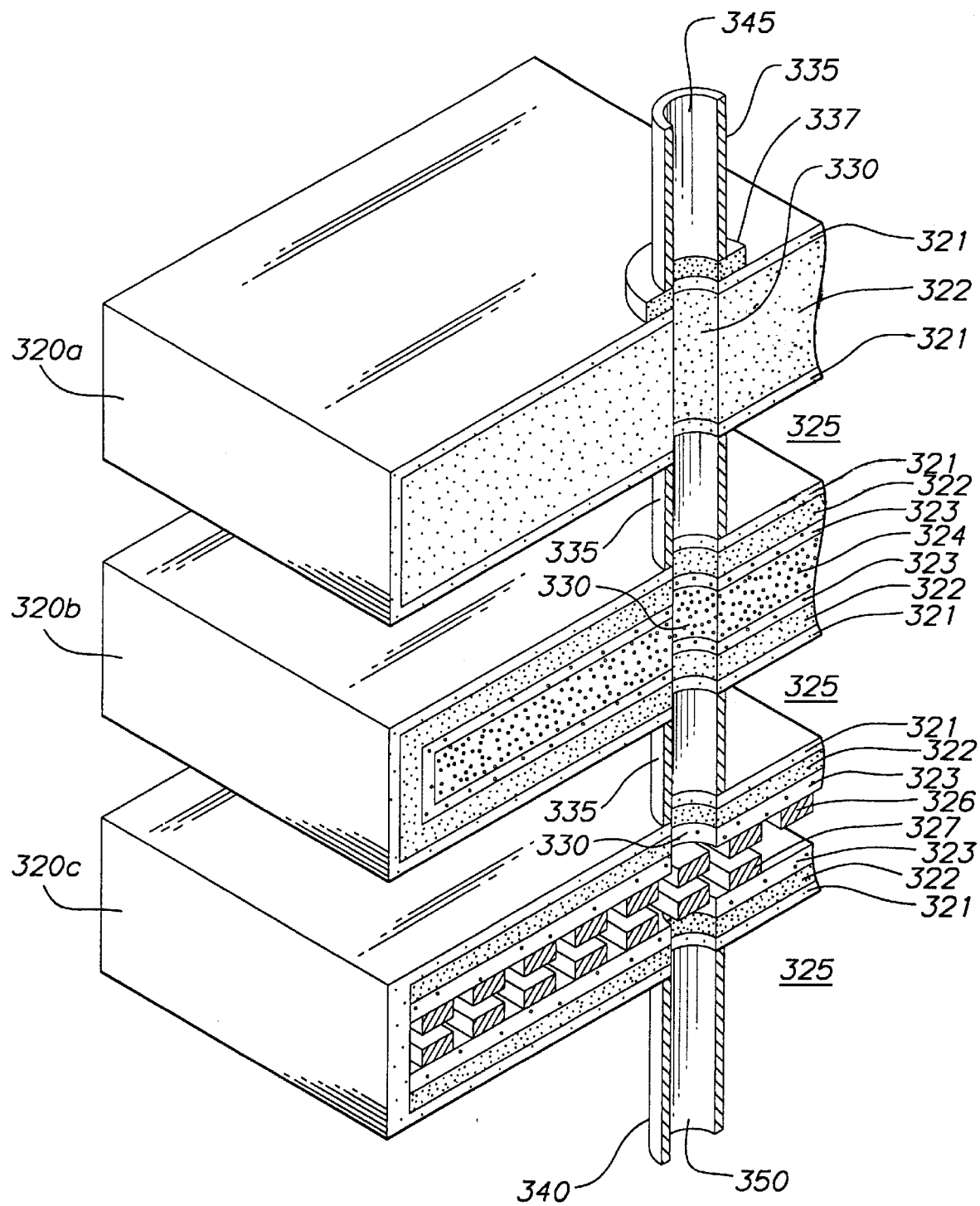
FIG. 4 is an exploded view of the planar solid-state electrochemical module of FIG. 3 which illustrates three membrane unit embodiments, each which present a dense mixed conducting oxide layer which is supported by a channelfree porous support have connected through porosity.

FIG. 4 is an exploded view of the planar solid-state electrochemical module of FIG. 3 which illustrates three membrane unit embodiments, each which present a dense mixed conducting oxide layer which is supported by a channel-free porous support have connected through porosity. Membrane units 320a, 320b, and 320c each possess a dense mixed conducting oxide layer 321 which is situated contiguous to porous support 322. Thus, membrane unit 320a represents the most general membrane unit of this embodiment.

Membrane unit 320b of FIG. 4 presents an alternate embodiment wherein the membrane unit 320b comprises a symmetrical arrangement of layers bounded by dense layer 321. Dense layer 321 is contiguous to support layer 322. Situated adjacent to and contiguous with the support layer 322 are a first porous layer 323 and a second porous layer 324. Membrane unit 320b possess symmetry wherein the second porous layer 324 forms the interior layer of the membrane unit onto which a first porous layer 323 is deposited on both sides of the second porous layer 324. Thus, porous support 322 and first and second porous layers 323 and 324, respectively provide an integral support for the dense separating layer which can withstand the pressure differential exerted on opposite side of the membrane unit during operating conditions. The porous layers of this embodiment can be fabricated utilizing the methods presented under FIG. 2.

Membrane unit 320c represents an adaptation of membrane unit 320b wherein the second porous layer 324 of membrane unit 320b is replaced by channeled layers 326, 327 and 328. Channeled layer 328 is situated between channeled layers 326 and 327 creating a network of channels which are in flow communication with conduits 335 and 345. Thus, channeled layers 326, 327 and 328 provide channels for receiving oxygen which has permeated dense separating layer 321, passed through porous support 333 and porous layer 323 into the channels of channeled layer 326 for collection as described in this Specification.

Figure 5:
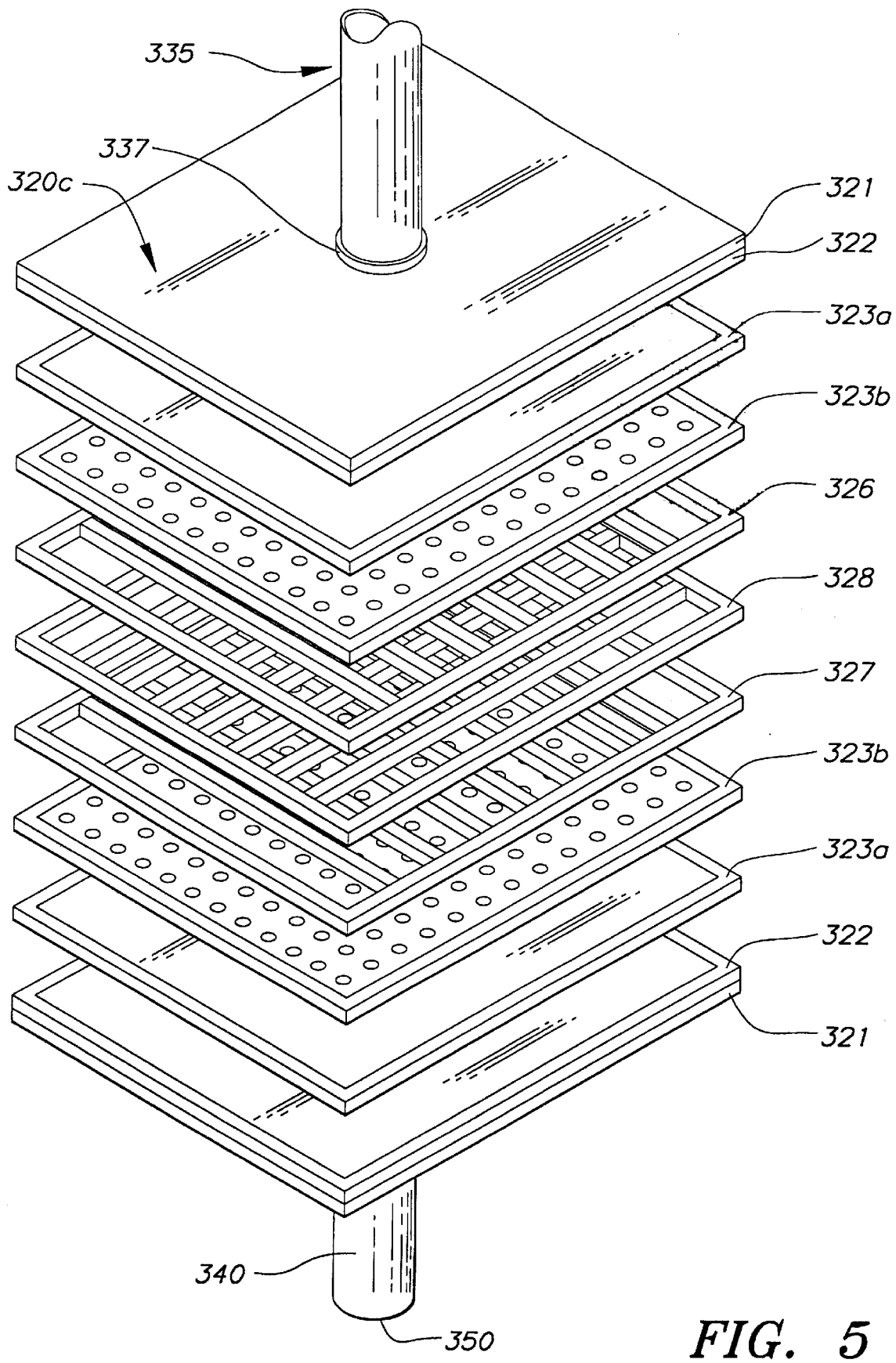
FIG. 5 is an exploded view of a preferred embodiment of a planar membrane unit suitable for incorporation into the planar solid-state membrane module illustrated in FIG. 3.

FIG. 5 presents an exploded view of a preferred embodiment of a planar membrane unit suitable for incorporation into the planar solid-state electrochemical module illustrated in FIG. 3. Membrane unit 320c possesses a symmetrical array of layers wherein the outermost layer of the membrane unit comprises a dense layer 321 and the innermost layer is a third channeled layer 328. The third channeled layer is contiguous to a first channeled layer 326 and a second channeled layer 327 wherein the channels of third channeled layer 328 are positioned is a direction substantially perpendicular to the channels in channeled layers 326 and 327.

The channels of channels layers 326, 327 and 328 are in flow communication with conduits 335 and 350. Conduit collar 337 serves to secure conduit 335 to membrane unit 320c. Situated between porous support 322 and the third channeled layer 328 are a first porous layer porous layer 323a and second porous layer 323b. Under operating conditions, an oxygen-containing gaseous mixture is placed in flow communication with dense layer 321 and oxygen is ionized and transferred through the dense layer 321 passing through the porous support 322, through first porous layer 323a, second porous layer 323b and into channeled layers 326, 327 and 328 which are in flow communication with conduits 335 and 350. Oxygen is collected via conduit opening 340 (not shown) and 350.

Figure 6:
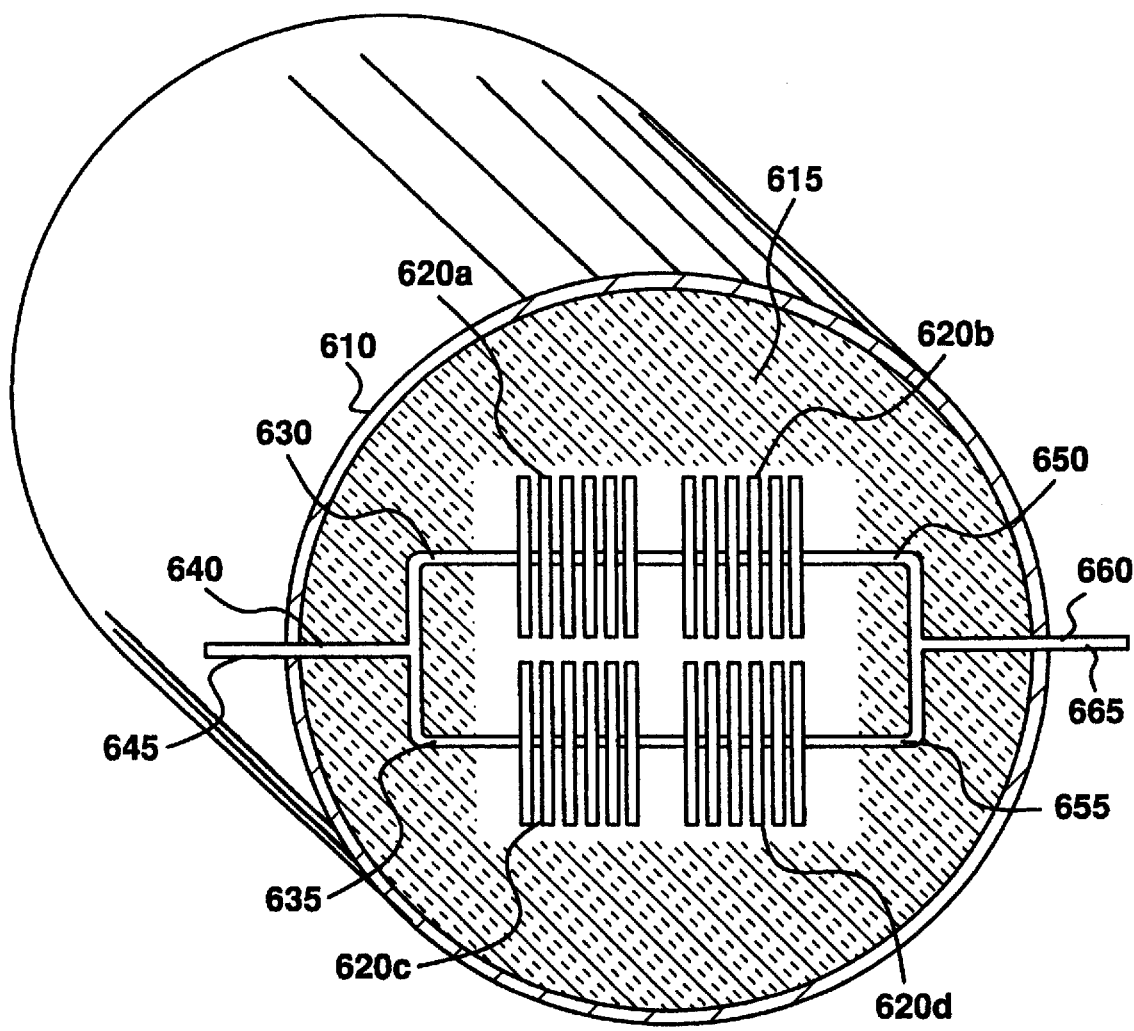
FIG. 6 is a top view of a housing suitable for receiving the planar membrane modules of the present invention which provides a means for introducing a heated oxygen-containing gaseous mixture to be separated into contact with the planar membrane modules and a means for discharging oxygen from the plurality of planar membrane units of the planar solid-state membrane modules.

FIG. 6 presents a top view of a housing suitable for receiving the planar membrane modules of the present invention. Housing structure 610, typically formed of a stainless steel pipe or conduit, is sized to a diameter capable of receiving planar module unit 620a, 620b, 620c and 620d. As depicted in FIG. 6, planar module units 620a and 620b are linked in series and planar module 620c and 620d are linked in series. Housing structure 610 is packed with insulation 615 in order to facilitate heat transfer between hot air which is passed through housing structure 610 into the passageways between the individual membrane units of the respective planar modules. The heated oxygen-containing gaseous mixture is in flow communication with the dense mixed conducting oxide layers of the respective membrane units of the gas separation modules 620a, 620b, 620c and 620d. Oxygen residing at the surface of the dense separating layer is caused to ionize and transfer through and into the dense separation layer of each membrane unit and to recombine into molecular oxygen in the porous support of each respective gas separation unit. Oxygen separated from the oxygen-containing gaseous mixture within membrane module 620a and 620b are collected via conduits 630 and 650. Oxygen separated by gas separation module 620c and 620d are collected in conduit 635 and 655. Thus, oxygen separated from the plurality of planar modules is collected in conduits 640 and 660, which conduits exit housing 610 via housing openings 635 and 665.

Planar modules 620a, 620b, 620c and 620d are fixably attached to housing structure 610 by supporting means (not shown) as is conventionally known in the art. The oxygen-containing gaseous mixture to be separated into an oxygen stream and an oxygen-depleted stream can be heated by any conventional means including gas-fired turbines, conventional heat exchangers and catalytic combustors.

Having described in detail the embodiments of the planar membrane modules, the following information is provided to further describe the membrane units which form the membrane modules as well as the materials and methods for making the same.

The porous support may be fabricated from an inert material in the sense that the material does not conduct oxygen ions and/or electrons at process operating conditions, or a mixed conducting oxide material of the same or different composition with respect to the dense layer of the membrane module. Preferably, the dense mixed conducting oxide layer comprises a multicomponent metallic oxide and the porous support comprises a mixed conducting oxide.

Representative examples of such suitable materials suitable for fabricating the porous support which do not conduct oxygen ions and electrons at elevated temperatures include alumina, ceria, silica, magnesia, titania, a high temperature oxygen compatible metal alloy, a metal oxide stabilized zirconia and compounds and mixtures thereof. However, the porous support is typically fabricated from a mixed conducting oxide material having thermal expansion properties which are compatible with the dense mixed conducting oxide layer.

As described in the patent application from which this patent application claims priority, suitable compositions for use in fabricating the dense mixed conducting oxide layer an/or the porous support of the membrane units depicted in the FIGS. 1 through 6. are represented by the formula $A_xA'_{x'}A''_{x''}B_yB'_{y'}B''_{y''}O_{3-z}$, where A,A',A" are chosen from the group comprising Groups 1, 2 and 3 and the F block lanthanides; and B,B',B" are chosen from the D block transition metals according to the Periodic Table of the Elements adopted by the IUPAC wherein $0<x\leq1$, $0\leq x'\leq1$, $0\leq x''\leq1$, $0<y\leq1$, $0\leq y'\leq1$, $1\leq y''\leq1$, $x+x'+x''=1$, $y+y'+y''=1$ and z is a number which renders the compound charge neutral. Preferably, A, A'or A" of the enumerated formula is a Group 2 metal-selected from the group consisting of calcium, strontium, barium and magnesium.

Multicomponent metallic oxides presented in the patent application from which this application depends are represented by the formula $La_xA'_{x'}Co_yFe_{y'}Cu_{y''}O_{3-z}$, wherein x +x'=0.9 –1.1, y +y' +y" =0.9 –1.1 with the proviso that y' and y" are greater than zero and less than or equal to 0.4, and A' is selected from strontium, barium or calcium. The planar dense layer is preferably formed from a mixed conducting oxide selected from the group consisting of $La_{0.2}Ba_{0.8}Co_{0.8}Fe_{0.2}O_{3-z}$, $Pr_{0.2}Ba_{0.8}Co_{0.8}Fe_{0.2}O_{3-z}$, $La_{0.2}Ba_{0.8}Co_{0.6}CU_{0.2}Fe_{0.2}O_{3-z}$, $La_{0.2}Sr_{0.8}Co_{0.4}Fe_{0.4}Cu_{0.2}O_{3-z}$, $La_{0.4}Sr_{0.6}Co_{0.4}Fe_{0.4}Cu_{0.2}O_{3-z}$, $La_{0.3}Sr_{0.7}Co_{0.8}Fe_{0.1}Cu_{0.1}O_{3-z}$ and $SrCo_{0.4}Fe_{0.4}Cu_{0.2}O_{3-z}$.

The thickness of the porous support of each membrane unit can be varied to ensure sufficient mechanical strength of the membrane unit. The planar porous support preferably has an average pore diameter of less than 6 times the thickness of the planar dense mixed conducting oxide layer. The planar dense mixed conducting oxide layer of each membrane unit typically has a thickness ranging from 0.01 micrometer to about 500 micrometers.

The inert porous layer can be formed from materials which do not conduct electrons but which conduct oxygen ions, such as a high temperature oxygen compatible metal alloy, metal oxide-stabilized zirconia such a yttria-stabilized zirconia and calcium-stabilized zirconia or materials which do not conduct electrons or oxygen ions, such as alumina, magnesia, silica, titania and compounds and mixtures thereof.

Any combination of inert porous layers and porous mixed conducting oxide layers can be utilized so long as their coefficients of thermal expansion are compatible and chemical reactions are minimized between the respective layers at membrane operating temperatures.

Thin dense layers of the desired multicomponent metallic oxide having a thickness ranging from 100 micrometers to about 0.01 micrometers in thickness can be deposited onto the enumerated porous layers by known techniques. For example, the membrane composites can be manufactured by first forming a porous body from relatively coarse sized particles of the multicomponent metallic oxide. A slurry of finer particles of the same material or a similar, compatible multicomponent metallic oxide may then be coated onto the porous material and cured to the green state, the two layer system then being fired to form the composite membrane.

The contiguous porous and dense layers of the membranes are formed from one or more multicomponent metallic oxides comprising an oxide of at least two different metals or a mixture of at least two different metal oxides wherein the multicomponent metallic oxide demonstrates electron conductivity as well as oxygen ion conductivity at elevated temperatures. Multicomponent metallic oxides suitable for practicing the present invention are referred to as "mixed"conducting oxides because such multicomponent metallic oxides conduct electrons as well as oxygen ions at elevated temperatures. A material which primarily demonstrates electronic conductivity can be combined with a material which primarily demonstrates ionic conductivity to form a composite which demonstrates mixed conductivity.

The multicomponent metallic oxides of the claimed invention may be prepared according to conventional methods including mixing and firing a desired stoichiometric ratio of the respective metallic oxides making up the mixed conducting oxide, thermally decomposing nitrates and acetates and utilizing the citric acid preparation method. Each of these methods is well known in the art and is suitable for making the multicomponent metallic oxides of the claimed invention.

The porous layers act as a compatible mechanical support for the dense mixed conducting oxide layer and provide two interacting diffusion paths for oxygen; through the pores, and through the solid. Surface kinetic rate limitations for gas-solid oxygen exchange are mitigated by the availability of a large "active" surface area in the small pore structure of the support, especially in the vicinity of the dense layer. On the other hand, the effect of the small pores in hindering diffusion is mitigated by fast ionic conduction in the solid.

The channeled layers may be fabricated from materials which possess connected through porosity or dense materials which do not possess connected through porosity. The channeled layers may be fabricated from an inert material in the sense that the material does not conduct oxygen ions or electrons at process operating conditions, or a mixed conducting oxide material of the same or different composition with respect to the dense layer or the porous support of the membrane module. As such, suitable materials are those previously described as suitable for fabricating the dense mixed conducting oxide layer and the porous support.

The composite membranes can be prepared by applying a dense layer of a desired multicomponent metallic oxide onto the desired porous substrate by conventional chemical vapor deposition techniques followed by sintering to obtain the desired dense layer. In order to obtain an optimal dense coating, a smaller average pore radius in the surface of the porous support may be used compared to the average pore radius in the bulk. This may be achieved by using two or more porous layers which differ in properties such as pore radius and porosity.

EXPERIMENTAL SECTION

The following examples are provided to further illustrate embodiments of the present invention and are not intended to limit the scope of the attached claims.

EXAMPLE 1

Preparation Of $La_{0.2}Sr_{0.8}Co_{0.4}Fe_{0.4}Cu_{0.2}O_{3-z}$

A membrane module may be fabricated wherein the dense mixed conducting oxide layer of each membrane unit is formed from $La_{0.2}Sr_{0.8}Co_{0.4}Fe_{0.4}Cu_{0.2}O_{3-z}$. This composition was prepared by a powder preparation technique wherein 2.05 parts by weight of $La_2O_3$, 7.42 parts by weight of $SrCO_3$, 1.88 parts by weight of CoO, 2.01 parts by weight of $Fe_2O_3$ and 1.00 part by weight of CuO were ball milled for 12 hours. The mixture was then fired in air to 1000° C. for 24 hours followed by cooling to room temperature. The mixture was then ground by ball milling, remixed and refired in air to 1000° C. for 24 hours followed by cooling to room temperature. The material possessed a perovskite crystal structure as determined by X-ray diffraction. The perovskite was air milled to about 1–5 $\mu$m particle size and combined with a plasticizer, binder and toluene solvent to form a slip suitable for tape casting.

EXAMPLE 2

Preparation Of $La_{0.4}Sr_{0.6}Co_{0.4}Fe_{0.4}Cu_{0.2}O_{3-z}$

A membrane module may be fabricated wherein the dense mixed conducting oxide layer of each membrane unit is formed from $La_{0.4}Sr_{0.6}Co_{0.4}Fe_{0.4}Cu_{0.2}O_{3-z}$. This composition was prepared by a powder preparation technique wherein 4.10 parts by weight of $La_2O_3$, 5.57 parts by weight of $SrCO_3$, 2.99 parts by weight of $CoCO_3$, 2.01 parts by weight of $Fe_2O_3$ and 1.00 part by weight of CuO were ball milled for 12 hours. The mixture was then fired in air to 1000° C. for 24 hours followed by cooling to room temperature. The mixture was then ground by ball milling, remixed and refired in air to 1000° C. for 24 hours followed by cooling to room temperature. The material possessed a perovskite crystal structure as determined by X-ray diffraction. The perovskite was ball milled to about 1–5 $\mu$m particle size and combined with a plasticizer, binder and toluene solvent to form a slip suitable for tape casting.

EXAMPLE 3

Preparation Of $La_{0.3}Sr_{0.7}CO_{0.8}Fe_{0.1}Cu_{0.1}O_{3-z}$

A membrane module may be fabricated wherein the dense mixed conducting oxide layer of each membrane unit is formed from $La_{0.3}Sr_{0.7}Co_{0.8}Fe_{0.1}Cu_{0.1}O_{3-z}$. This composition was prepared by a powder preparation technique wherein 6.14 parts by weight of $La_2O_3$, 12.99 parts by weight of $SrCO_3$, 11.96 parts by weight of $CoCO_3$, 1.00 parts by weight of $Fe_2O_3$ and 1.00 part by weight of CuO were ball milled for 12 hours. The mixture was then fired in air to 1000° C. for 24 hours followed by cooling to room temperature. The mixture was then ground by ball milling, remixed and refired in air to 1000° C. for 24 hours followed by cooling to room temperature. The material possessed a perovskite crystal structure as determined by X-ray diffraction. The perovskite was air milled to about 1–5 $\mu$m particle size and combined with a plasticizer, binder and toluene solvent to form a slip suitable for tape casting.

EXAMPLE 4

Preparation Of $La_{0.6}Ca_{0.4}Co_{0.2}Fe_{0.6}Cu_{0.6}O_{3-z}$

A membrane module may be fabricated wherein the dense mixed conducting oxide layer of each membrane unit is formed from $La_{0.6}Ca_{0.4}Co_{0.2}Fe_{0.6}Cu_{0.6}O_{3-z}$. This composition was prepared by a powder preparation technique wherein 6.14 parts by weight of $La_2O_3$, 2.52 parts by weight of $CaCO_3$, 1.50 parts by weight of $CoCO_3$, 3.01 parts by weight of $Fe_2O_3$ and 1.00 part by weight of CuO were ball milled for 12 hours. The mixture was then fired in air to 1000° C. for 24 hours followed by cooling to room temperature. The mixture was then ground by ball milling, remixed and refired in air to 1000° C. for 24 hours followed by cooling to room temperature. The material possessed a perovskite crystal structure as determined by X-ray diffraction. The perovskite was air milled to about 1–5 $\mu$m particle size and combined with a plasticizer, binder and toluene solvent to form a slip suitable for tape casting.

EXAMPLE 5

Preparation Of $Z_{0.2}Sr_{0.8}Co_{0.4}Fe_{0.4}Cu_{0.2}O_{3-z}$

Z=mixed lanthanide

A membrane module may be fabricated wherein the dense mixed conducting oxide layer of each membrane unit is formed from $Z_{0.2}Sr_{0.8}Co_{0.4}Fe_{0.4}Cu_{0.2}O_{3-z}$. This composition was prepared by a mixed nitrate decomposition preparation technique wherein Molycorp mixed lanthanide solution, lot number 5248, was used as the lanthanide source. This material consisted of 76.6% lanthanide nitrate hexahydrate by weight. The lanthanide content, reported on a oxide basis, was: $CeO_2$ 5.4 weight %, $La_2O_3$ 21.6%, $Nd_2O_3$ 8.5%, $Pr_6O_{11}$ 2.8% and other lanthanide oxides 0.4 weight %. 7.13 parts by weight of the lanthanide nitrate solution, 10.64 parts by weight of $SrNO_3$, 7.32 parts by weight of cobalt(II) nitrate hexahydrate, 10.16 parts by weight of iron(III) nitrate nonahydrate and 1.00 part by weight of copper(II) nitrate hemipentahydrate were dissolved together in sufficient water to dissolve all of the salts. The solution was then boiled to remove the water. Final drying took place in an oven at 120° C. The mixed salts were then fired in air to 1000° C. for 24 hours followed by cooling to room temperature. The mixture was then ground by ball milling, remixed and refired in air to 1000° C. for 24 hours followed by cooling to room temperature. The material possessed a perovskite crystal structure as determined by X-ray diffraction. The perovskite was air milled to about 1–5 $\mu$m particle size and combined with a plasticizer, binder and toluene solvent to form a slip suitable for tape casting.

Having described the preferred method for making the compositions of the present invention, Applicants shall present data in support of the benefits respecting chemical and physical properties which are afforded by the compositions of the present invention.

EXAMPLE 6

Chemical Properties Of Claimed Compositions Versus Prior Art Compositions

This example illustrates the effect of oxygen partial pressure on the stability of the claimed compositions according to this invention compared to the compositions recited in Yamazoe and coworkers (Chem. Lett., pp. 503–6 (1988)) and U.S. Pat. No. 5,240,480. This series of experiments demonstrates that the claimed compositions do not decompose under conditions of elevated oxygen partial pressure which can exist is certain oxygen separation applications.

The experiments were conducted according to the following procedure. Multicomponent metallic oxide powders were prepared according to the previous Examples and analyzed by x-ray diffraction. Samples of the indicated compositions were placed in a furnace and exposed for one week to the temperatures and oxygen partial pressures indicated in the Table. Following the one week period, each sample was cooled to room temperature and examined by x-ray diffraction to determine whether or not the sample had decomposed.

The Table demonstrates that the barium-containing compositions presented in U.S. Pat. No. 5,240,480 decompose at oxygen partial pressures of 1 atm or more at a temperature of 850° C. Moreover, the composition recited in the Yamazoe reference identified in the Table decomposes at oxygen partial pressures of 4.5 atm or more at a temperature of 850° C.

The compositions of the present invention showed no decomposition upon being subjected to 4.5 atm oxygen partial pressure at 850° C. for a one week period. Therefore, the compositions of the present invention are suitable for use in oxygen separation devices which typically require elevated oxygen partial pressures in a process feedstream. In contrast, the recited prior art materials must be operated under lower oxygen partial pressures than the compositions of the claimed invention when utilized in devices for separating oxygen which are operated at elevated temperatures.

TABLE

| Composition | Annealing Condition (one week elapsed time) | | |
|---|---|---|---|
| | 0.21 atm $O_2$ at 850° C. | 1 atm $O_2$ at 850° C. | 4.5 atm $O_2$ at 850° C. |
| $La_{0.2}Ba_{0.8}Co_{0.6}Fe_{0.2}Cu_{0.2}O_{3-z}$ (U.S. Pat. No. 5,240,480) | stable | decomposes | decomposes |
| $La_{0.6}Ba_{0.4}Co_{0.8}Fe_{0.2}O_{3-z}$ (Chem. Let. 503–506 (1988)) | stable | stable | decomposes |
| $La_{0.2}Sr_{0.8}Co_{0.4}Fe_{0.4}Cu_{0.2}O_{3-z}$ | stable | stable | stable |
| $La_{0.4}Sr_{0.6}Co_{0.4}Fe_{0.4}Cu_{0.2}O_{3-z}$ | stable | stable | stable |

EXAMPLE 7

Thermal Expansion Properties Of Claimed Compositions Versus Prior Art Compositions This example demonstrates the thermal expansion properties of the compositions of the present invention compared to the compositions presented in the Yamazoe reference (Chem. Lett., pp. 503–6 (1988)) and in the Kharton reference (Inorganic Materials, vol. 30, #4, 1994, pp. 492–5).

The compositions of the present invention were prepared according to the method recited in the previous examples while the comparative materials were prepared according to the methods presented in the recited references. Samples for measuring the coefficients of thermal expansion were prepared from disks formed by conventional pressing and sintering techniques. The respective samples were heated in air at a rate of 2° C./min over the temperature ranges specified in FIGS. 7, 8 and 9 and the dimensional changes for each sample were plotted as a function of temperature.

Figure 7:
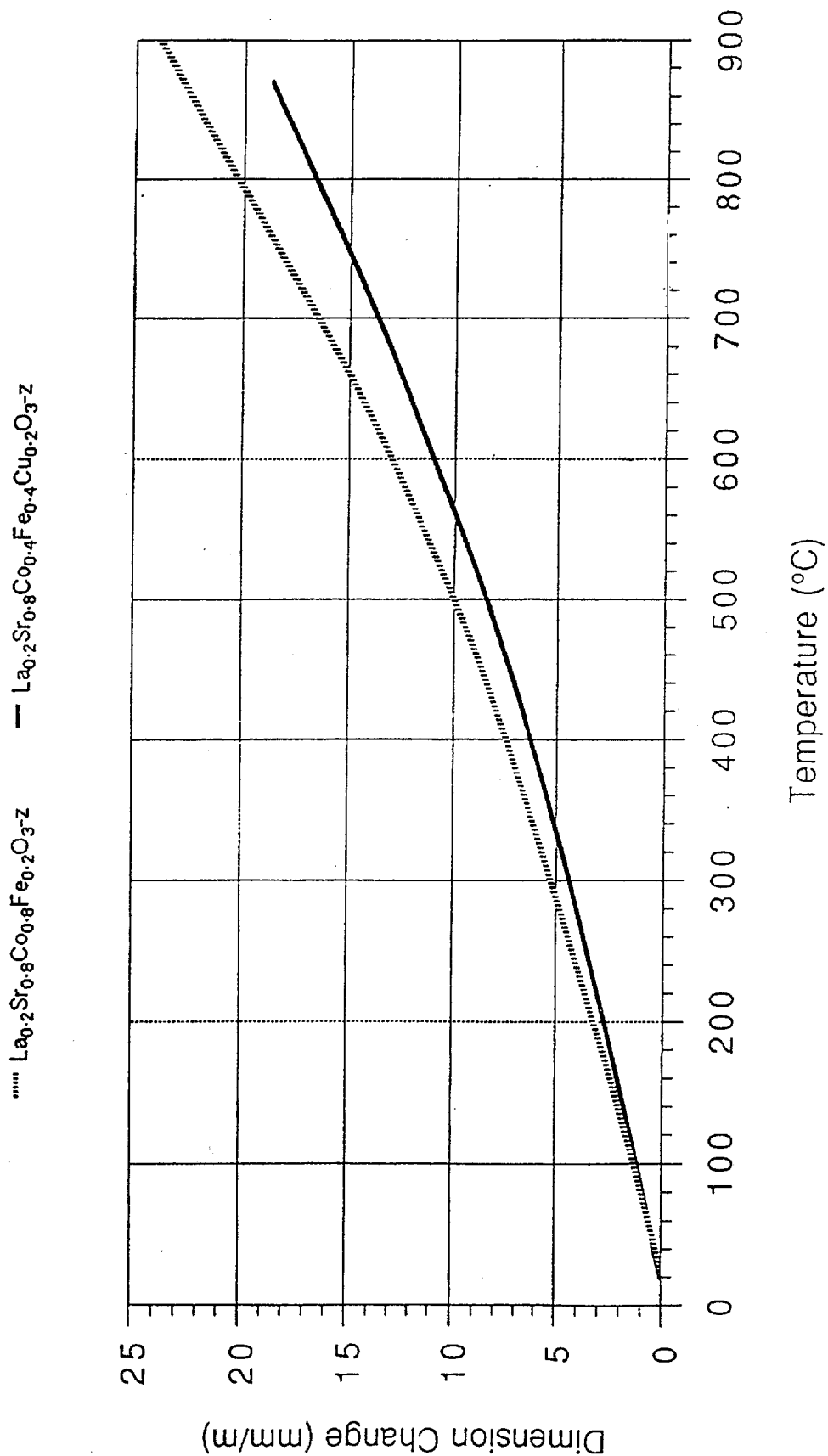
FIG. 7 illustrates the dimensional changes of a preferred multicomponent metallic oxide, $La_{0.2}Sr_{0.8}CO_{0.4}Fe_{0.4}Cu_{0.2}O_{3-z}$, as a function of temperature thereby illustrating unexpectedly improved control of the coefficient of thermal expansion when copper is introduced into the perovskite structure.

FIG. 7 illustrates the dimensional change as a function of temperature exhibited by a composition according to the claimed invention versus a composition presented in the Yamazoe reference (Chem. Lett., pp. 503–6(1988)).

FIG. 7 illustrates that the coefficient of thermal expansion demonstrated by the claimed composition is much lower than the coefficient of thermal expansion exhibited by the Yamazoe composition.

Figure 8:
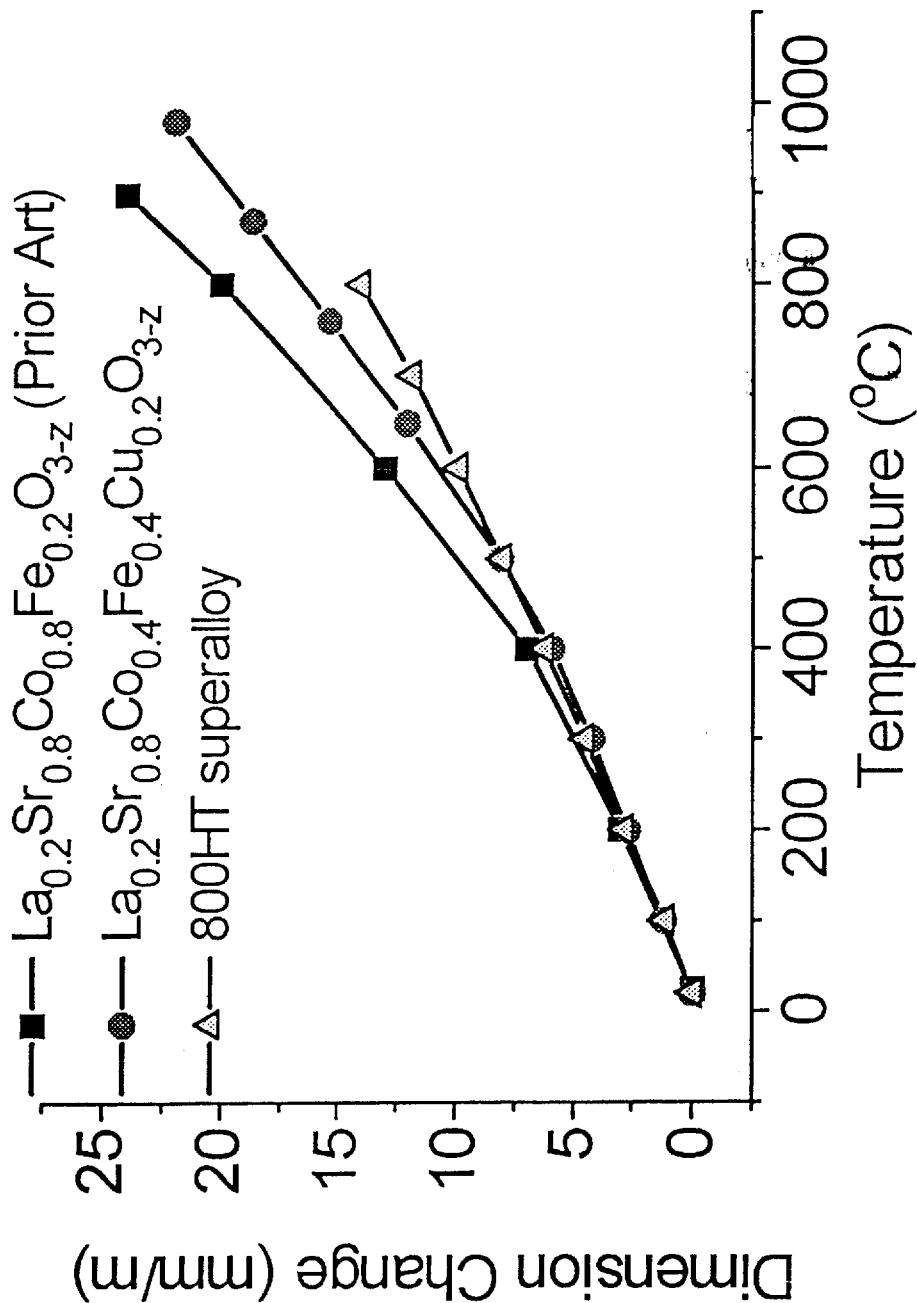
FIG. 8 illustrates the dimensional changes of a preferred multicomponent metallic oxide, $La_{0.2}Sr_{0.8}Co_{0.4}Fe_{0.4}Cu_{0.2}O_{3-z}$, as a function of temperature versus a prior art composition and illustrates the compatibility between the coefficient of thermal expansion of the compositions of the claimed invention and conventional engineering alloys employed in oxygen separation devices.

The lower coefficient of thermal expansion exhibited by the compositions of the claimed invention provide a substantial benefit as depicted in FIG. 8 which compares the data presented in FIG. 7 with data regarding dimensional changes as a function of temperature for a typical engineering superalloy suitable for use at high temperatures such as Incoloy 800HT nickel-based superalloy, sold by Inco Alloys International, Inc., Huntington, W. Va. Optimally, the coefficients of thermal expansion for the various components of an oxygen separation device should be matched as closely as possible to reduce thermo-mechanical stress which occurs when such devices are subjected to heating and cooling cycles. FIG. 8 illustrates that the compositions of the present invention possess a thermal expansion coefficient which is more closely matched to a typical superalloy than the composition of the Yamazoe reference.

Figure 9:
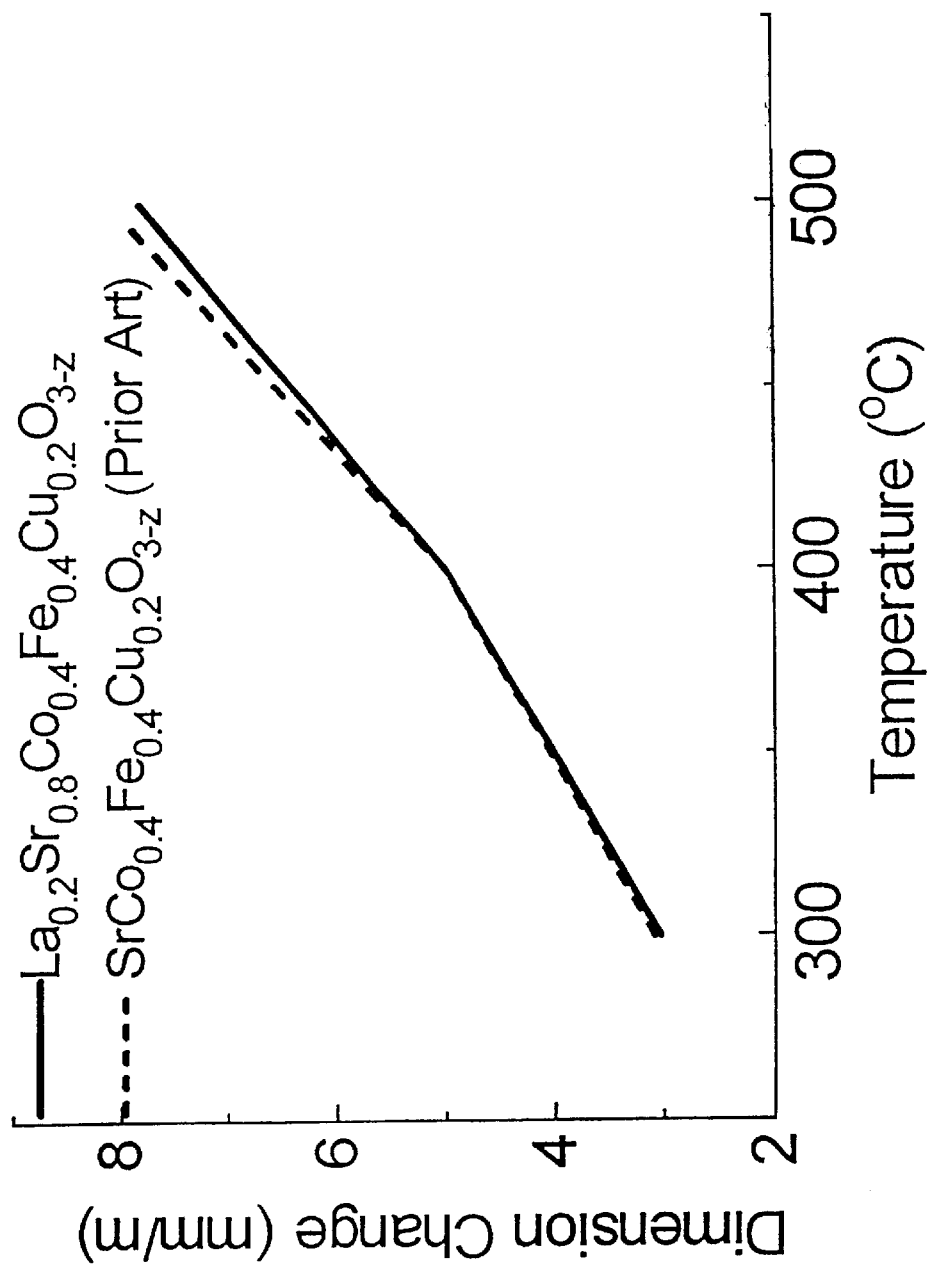
FIG. 9 illustrates the dimensional changes of a preferred multicomponent metallic oxide, $La_{0.2}Sr_{0.8}Co_{0.4}Fe_{0.4}Cu_{0.2}O_{3-z}$, as a function of temperature versus an alternate prior art composition.

FIG. 9 illustrates the dimensional changes of a preferred multicomponent metallic oxide, $La_{0.2}Sr_{0.8}Co_{0.4}Fe_{0.4}Cu_{0.2}O_{3-z}$, as a function of temperature versus an alternate prior art composition presented in the Kharton reference (Inorganic Materials, vol. 30, #4, 1994, pp. 492–5). FIG. 9 illustrates that the coefficient of thermal expansion demonstrated by the claimed composition is much lower than the coefficient of thermal expansion exhibited by the Kharton composition. Thus, the advantages presented in FIG. 8 are also afforded.

EXAMPLE 8

Sintering Temperature Properties Of Claimed Compositions Versus Prior Art Compositions This example illustrates the relationship between sintering temperature and the elements comprised in a prior art composition presented in the Yamazoe reference (Chem. Lett., pp. 503–6 (1988)) and two compositions according to the claimed invention. Those of ordinary skill in the art recognize that oxygen separation devices which utilize membranes formed from multicomponent metallic oxides are desirably operated at temperatures lower than the sintering temperature of the multicomponent metallic oxide from which the device has been fabricated in order to minimize undesirable mechanical deformations such as creep which may occur during operation of the devices over long periods of time.

Figure 10:
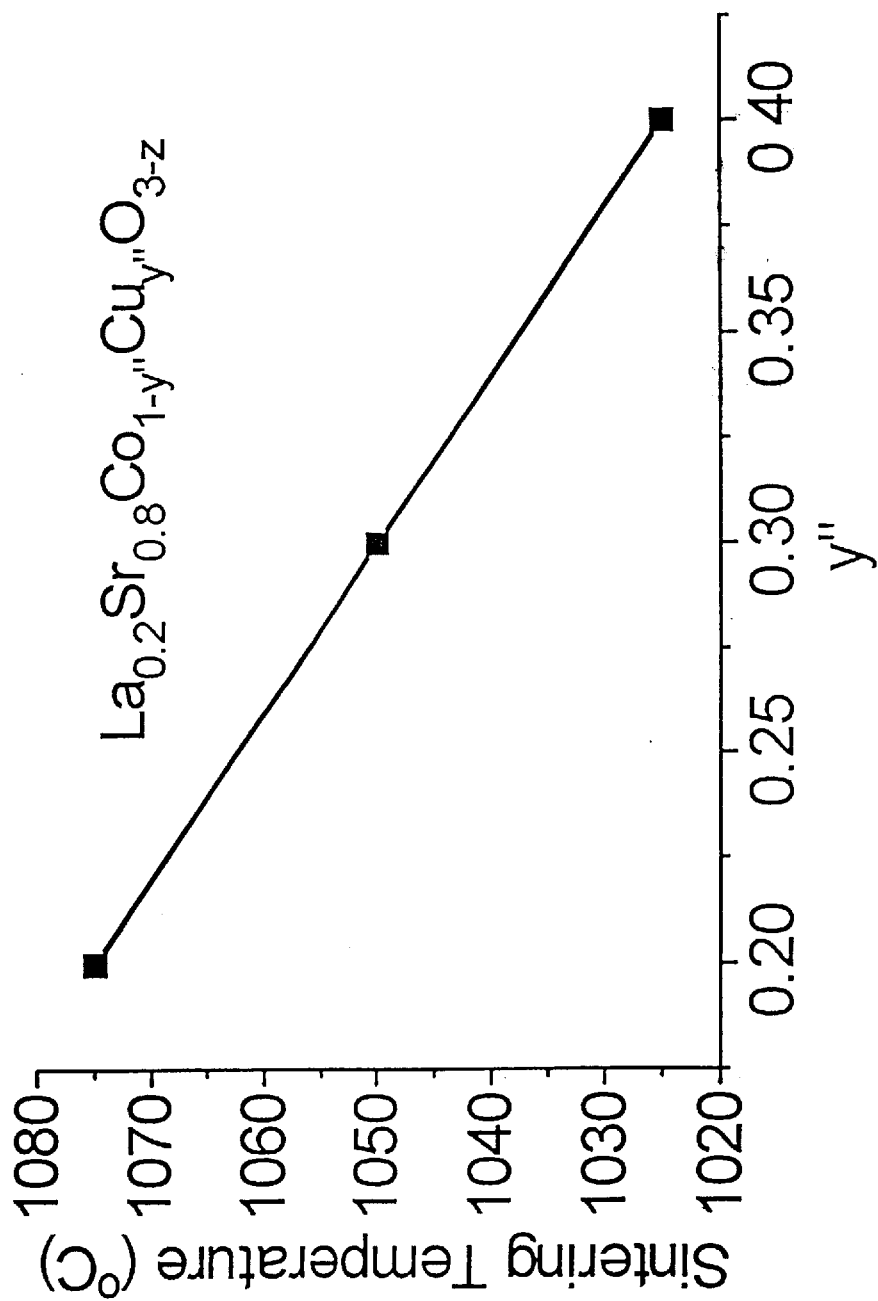
FIG. 10 presents a plot of sintering temperature versus copper content of a prior art composition.

FIG. 10 presents data concerning compositions presented in the Yamazoe reference (Chem. Lett., pp. 503–6 (1988)). FIG. 10 presents a plot of copper content of a Yamazoe composition versus the temperature at which the composition sinters typically to form a greater than 95% dense material. The plot illustrates that sintering temperature decreases as the copper content of the multicomponent metallic oxide increases and that the sintering temperature is less than or equal to 1075° C. when y" is greater than or equal to 0.2. As the sintering temperature decreases, devices formed from such multicomponent metallic oxides must be operated at successively lower temperatures to avoid problems associated with mechanical deformation. However, those of ordinary skill in the art also recognize that the rate of oxygen transport through the multicomponent metallic oxide membrane also decreases with decreasing device operating temperature.

Figure 11:
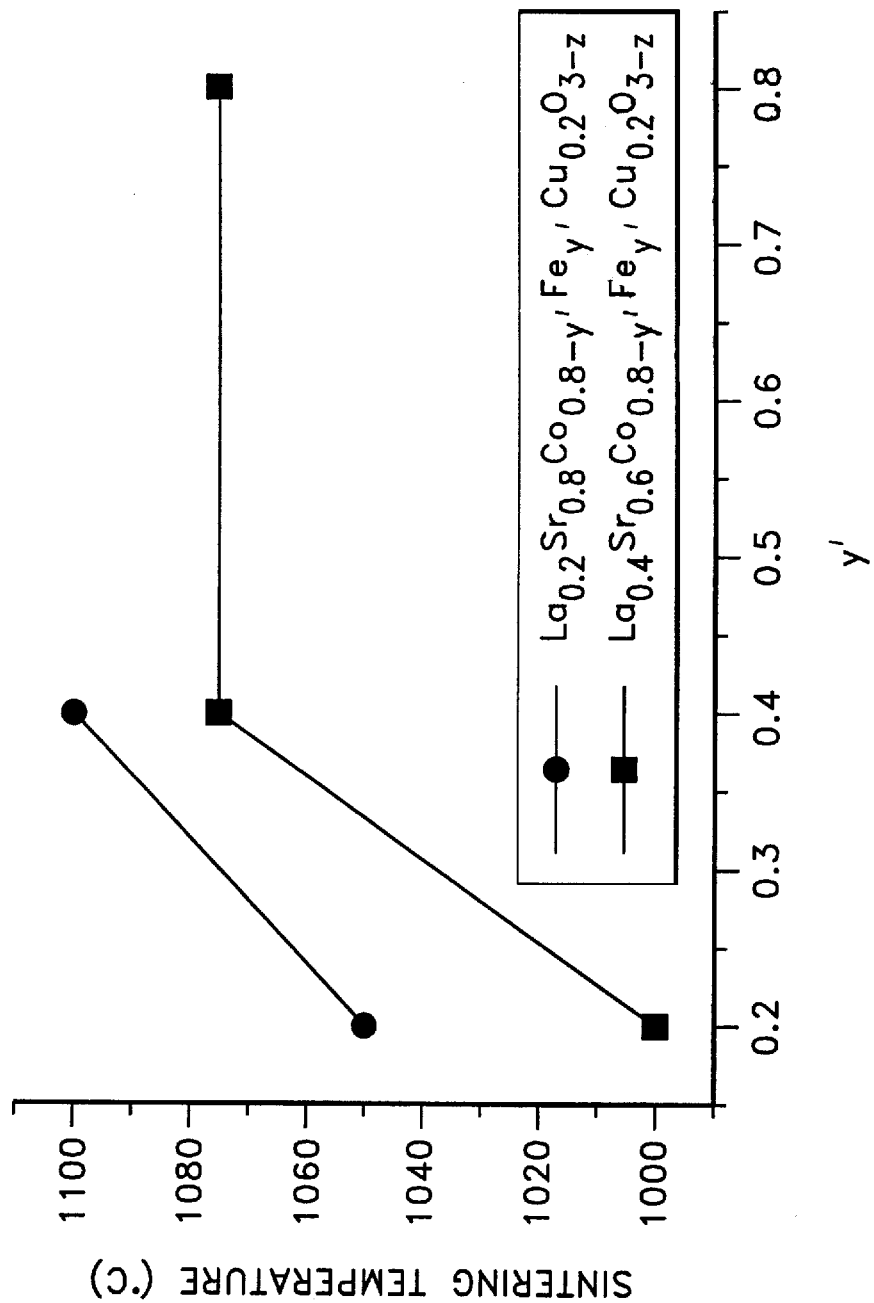
FIG. 11 presents a plot of sintering temperature versus iron content of two claimed compositions.

FIG. 11 presents data relating to compositions according to the claimed invention. FIG. 11 presents a plot of iron content of two claimed compositions versus the temperature at which such compositions sinter typically to form a greater than 95% dense material. The plot illustrates that sintering temperature increases as the iron content of the claimed multicomponent metallic oxides increases. In particular, when y' presented in the claimed compositions is greater than or equal to 0.4, the sintering temperature for each of the claimed compositions is greater than or equal to 1075° C. Therefore, oxygen separation devices formed from the compositions of the present invention can be operated at higher temperatures than afforded by conventional prior art materials to provide the highest possible oxygen transport rate over time.

Those skilled in the art will appreciate that the claimed multicomponent metallic oxides are suitable for use in solid-state oxygen-producing devices and overcome problems associated with instability due to operation at elevated oxygen partial pressures and undesirable sintering temperatures and coefficients of thermal expansion demonstrated by prior art materials. Applicants set forth their invention as described in the claims which are appended hereto.

We claim:

1. A composition of matter represented by the formula $Ln_xA'_{x'}Co_yFe_{y'}Cu_{y''}O_{e-z}$ wherein Ln is an element selected from the f block lanthanides as represented by the IUPAC periodic table of the elements, A' is selected from strontium or calcium, x>0, y>0, y'>0, x+x'=1, y+y'+y''=1, 0<y''≦0.4 and z is a number which renders the composition of matter charge neutral.

2. A composition of matter represented by the formula $Z_xA'_{x'}Co_yFe_{y'}Cu_{y''}O_{3-z}$ wherein Z is a mixture of lanthanum and at least one element other than lanthanum which is selected from the f block lanthanides as represented by the IUPAC periodic table of the elements, A' is selected from strontium or calcium, x>0, y>0, x+x'=1, y'>0, 0 <y''≦0.4, y+y'+y''=1, and z is a number which renders the composition of matter charge neutral.

3. A composition of matter represented by the formula $La_xA'_{x'}Co_yFe_{y'}Cu_{y''}O_{3-z}$ wherein A' is selected from strontium or calcium, x>0, y>0, x +x'=1, y'>0, 0<y''≦0.4, y+y'+y''=1, and z is a number which renders the composition of matter charge neutral.

4. The composition of matter according to claim 3 wherein A' is strontium, x is 0.2, x' is 0.8 and y is 0.4, y' is 0.4 and y'' is 0.2.

5. The composition of matter according to claim 3 wherein A' is strontium, x is 0.4, x' is 0.6 and y is 0.4, y' is 0.4 and y'' is 0.2.

6. The composition of matter according to claim 3 wherein A' is strontium, x is 0.3, x' is 0.7 and y is 0.8, y' is 0.1 and y'' is 0.1.

7. The composition of matter according to claim 3 wherein A' is calcium, x is 0.6, x' is 0.4 and y is 0.2, y' is 0.6 and y'' is 0.2.

* * * * *